Patented Apr. 6, 1943

2,316,136

UNITED STATES PATENT OFFICE 2,316,136

PROCESS FOR THE ISOMERIZATION OF DIHYDROBENZENES

Norris Turnbull, Niagara Falls, N. Y., assignor to E. I. du Pont de Nemours & Company, Wilmington, Del., a corporation of Delaware No Drawing. Application August 7, 1941, Serial No. 405,829

12 Claims. (Cl. 260—666)

This invention relates to the molecular rearrangement of dihydrobenzenes and more particularly it relates to a process for the molecular rearrangement of 1,4-dihydrobenzene.

Although the literature describes a great variety of molecular rearrangements of organic compounds, such as the rearrangement of hydrazobenzene to benzidine by treatment of the former with strong acids, no method has been known heretofore for the rearrangement of 1,4-dihydrobenzene.

It is one of the objects of this invention to provide a process for the rearrangement of 1,4-dihydrobenzene. Another object of this invention is to provide a novel process for the production of 1,2-dihydrobenzene. These and other objects will be apparent from the ensuing description of my invention.

The above objects are attained in accordance with this invention by heating 1,4-dihydrobenzene in the presence of an alkaline medium. I have found that when 1,4-dihydrobenzene in the liquid phase is heated above its boiling point in contact with an alcoholate of an alkali metal good yields of 1,2-dihydrobenzene are obtained.

It is essential to the successful operation of my invention that the reaction mixture be heated in the liquid phase above the boiling point of 1,4-dihydrobenzene and preferably the reaction is carried out at substantially 125° C. to 150° C. While temperatures below 125° C. may be utilized the reaction at such lower temperatures is slower and therefore generally undesirable for commerical operation. Furthermore, temperatures above 150° C. may be utilized successfully but I have found that in general such higher temperatures tend to produce high boiling products which are usually undesirable. My invention is not restricted to carrying out my novel molecular rearrangement at any specified temperature as I have found that temperatures within the range of 100 to 200° C. are also satisfactory.

Any alcoholate of an alkali metal may be used in carrying out the process of my invention. For instance, sodium methylate, sodium ethylate, sodium butylate, sodium tertiary amylate, sodium methyl cyclohexanolate, and sodium benzylate may be utilized.

For the most satisfactory operation of my process I have found that it is necessary in order to obtain good contact of the alkali metal alcoholate with 1,4-dihydrobenzene to utilize either an alcoholate which is soluble in the 1,4-dihydrobenzene or to use a mutual solvent for the alcoholate and 1,4-dihydrobenzene. For example, I have found that sodium tertiary amylate is sufficiently soluble in 1,4-dihydrobenzene and excellent results are obtained when this alcoholate is utilized in carrying out the process of my invention in the absence of added solvent. I have also found that when an alcoholate such as sodium methylate which does not dissolve in the 1,4-dihydrobenzene is used, good results are readily obtained when an excess of the methyl alcohol used in preparing the sodium methylate is utilized. Alcohols or solvents other than the one utilized in preparing the particular alcoholate may be used so long as the alcohol or solvent used is a mutual solvent for 1,4-dihydrobenzene and the alcoholate.

The alcoholate which I utilize in carrying out the process of my invention may be prepared in situ or an alcoholate previously prepared and isolated may be used. I hav found it convenient to prepare an alcoholate solution and then to add the 1,4-dihydrobenzene directly to the prepared solution. Alkali metal alcoholates other than sodium alcoholates, for instance potassium alcoholates may be used in my invention but generally I prefer to use sodium alcoholates since these are less expensive and are more readily obtainable.

Varying amounts of the alkali metal alcoholate may be utilized in carrying out the novel rearrangement of my invention which is not restricted to any particular concentration of alcoholate. I have found that amounts of alkali metal alcoholate from 2 to 25% based on the weight of 1,4-dihydrobenzene are entirely satisfactory. However, less than 2% of the alcoholate may be used and furthermore, amounts in excess of 25% may be utilized, although I have found no advantage in using such increased amounts which, of course, serve to increase the cost of the process. Ordinarily about 5% of alkali metal alcoholate based on the weight of the 1,4-dihydrobenzene is entirely satisfactory.

In one method for carrying out the process of my invention the alcoholate or a solution of the alcoholate in alcohol is placed in a suitable pressure vessel. Preferably the air in the pressure vessel is replaced with nitrogen or other inert gas. The 1,4-dihydrobenzene is then added to the contents of the pressure vessel, and the vessel is sealed and heated until the reaction is complete. Usually about 15 to 25 hours is sufficient. At the end of the heating period the product may be recovered from the reaction mixture by fractional distillation in the usual manner. I have found that it is generally desirable to neutralize the alkali and separate and dry the reaction products before fractionation.

While I have described my invention with particular reference to the rearrangement of 1,4-dihydrobenzene, my process is also applicable to the rearrangement of substituted dihydrobenzenes such as dihydrotoluene, dihydroethylbenzene, and other substituted dihydrobenzenes.

The following examples illustrate my invention.

Example I 1 g. of metallic sodium was dissolved in 60 cc. of methyl cyclohexanol under reflux in an atmosphere of nitrogen. The warm solution containing sodium cyclohexanolate was transferred to a Carius tube. The air in the Carius tube was replaced with nitrogen and 30 cc. of 1,4-dihydrobenzene introduced by means of a capillary funnel. The Carius tube was then sealed and heated in a bomb furnace at 150° C. during 16 hours. At the end of the heating period the tube was cooled, the seal broken, and the contents decanted into a still from which the reaction mixture was fractioned at atmospheric pressure. The recovery of 1,2-dihydrobenzene was 24%.

Example II 5 g. of sodium tertiary amylate was placed in a Carius tube, the air in the tube replaced with nitrogen, and 30 cc. of 1,4-dihydrobenzene introduced through a capillary funnel. The Carius tube was then sealed and heated in a bomb furnace at 150° C. during 16 hours. The tube was then cooled, the seal broken, and the contents decanted off and washed free of alkali (to litmus paper) with small amounts of distilled water using a total of 75 cc. of water. The oil layer was then separated and the water layer acidified and saturated with ammonium sulfate. A second layer of oil was separated and added to the first oil obtained. The combined oil layers were dried 2 to 3 hours with anhydrous magnesium sulfate and fractionally distilled at atmospheric pressure. The recovery of 1,2-dihydrobenzene was 71%.

Example III

The procedure of Example II was followed except that 1 g. of sodium tertiary amylate was used instead of 5 g. and the reaction mixture was distilled directly from the reaction vessel and then fractioned at atmospheric pressure. The recovery of 1,2-dihydrobenzene was 69%.

Example IV

The procedure of Example I was substantially followed using 2 g. of metallic sodium in methanol instead of a solution of methyl cyclohexanolate and heating the reaction mixture during 16 hours at 125° C. The recovery of 1,2-dihydrobenzene was 51%.

Various modifications of my invention will be apparent to those skilled in the art without departing from the scope of my invention.

My novel process provides a practical method for the production of 1,2-dihydrobenzene and the process is simple to operate and readily carried out on any desired scale.

The 1,2-dihydrobenzene produced in accordance with my invention is useful as a solvent for various oils and waxes. Furthermore, the product may be used in the preparation of resins particularly in conjunction with other polymerizable compounds.

The 1,4-dihydrobenzene utilized in the process of my invention may be prepared in accordance with the procedure described in United States Patent 2,182,242.

I claim:

1. The process which comprises heating 1,4-dihydrobenzene in the liquid phase at temperatures above the atmospheric boiling point of said 1,4-dihydrobenzene in contact with an alkali metal alcoholate and recovering 1,2-dihydrobenzene from the reaction mixture.

2. The process which comprises heating 1,4-dihydrobenzene in the liquid phase at temperatures above the atmospheric boiling point of said 1,4-dihydrobenzene in contact with an alkali metal alcoholate and a mutual solvent.

3. The process which comprises heating 1,4-dihydrobenzene in the liquid phase at temperatures of 125 to 150° C. in contact with an alkali metal alcoholate and recovering 1,2-dihydrobenzene from the reaction mixture.

4. The process which comprises heating 1,4-dihydrobenzene in the liquid phase at temperatures above the atmospheric boiling point of said 1,4-dihydrobenzene in contact with sodium tertiary amylate and recovering 1,2-dihydrobenzene from the reaction mixture.

5. The process which comprises heating 1,4-dihydrobenzene in the liquid phase at temperatures of 125 to 150° C. in contact with sodium tertiary amylate and recovering 1,2-dihydrobenzene from the reaction mixture.

6. The process which comprises heating 1,4-dihydrobenzene in the liquid phase at temperatures above the atmospheric boiling point of said 1,4-dihydrobenzene in contact with sodium methylate and a mutual solvent and recovering 1,2-dihydrobenzene from the reaction mixture.

7. The process which comprises heating 1,4-dihydrobenzene in the liquid phase at temperatures of 125 to 150° C. in contact with sodium methylate and a mutual solvent and recovering 1,2-dihydrobenzene from the reaction mixture.

8. The process which comprises heating 1,4-dihydrobenzene in the liquid phase at temperatures above the atmospheric boiling point of said 1,4-dihydrobenzene in contact with sodium methylate and methyl alcohol and recovering 1,2-dihydrobenzene from the reaction mixture.

9. The process which comprises heating 1,4-dihydrobenzene in the liquid phase at temperatures above the atmospheric boiling point of said 1,4-dihydrobenzene in contact with sodium methyl cyclohexanolate and recovering 1,2-dihydrobenzene from the reaction mixture.

10. The process which comprises heating 1,4-dihydrobenzene in the liquid phase at temperatures above the atmospheric boiling point of said 1,4-dihydrobenzene in contact with sodium methyl cyclohexanolate and a mutual solvent and recovering 1,2-dihydrobenzene from the reaction mixture.

11. The process which comprises heating 1,4-dihydrobenzene in the liquid phase at temperatures above the atmospheric boiling point of said 1,4-dihydrobenzene in contact with sodium methyl cyclohexanolate and methyl cyclohexanol and recovering 1,2-dihydrobenzene from the reaction mixture.

12. The process which comprises heating 1,4-dihydrobenzene in the liquid phase at temperatures of 125 to 150° C. in contact with sodium methyl cyclohexanolate and methyl cyclohexanol recovering 1,2-dihydrobenzene from the reaction mixture.

NORRIS TURNBULL.